(12) United States Patent
Golden

(10) Patent No.: US 7,385,497 B2
(45) Date of Patent: Jun. 10, 2008

(54) MULTI SENSOR DETECTION AND LOCK DISABLING SYSTEM

(76) Inventor: Larry Golden, 522 Peach Grove Pl., Mauldin, SC (US) 29662

(*) Notice: Subject to any disclaimer, the term of this patent is extended or adjusted under 35 U.S.C. 154(b) by 118 days.

(21) Appl. No.: 11/397,118

(22) Filed: Apr. 5, 2006

(65) Prior Publication Data

US 2007/0241881 A1    Oct. 18, 2007

(51) Int. Cl.
*G08B 19/00* (2006.01)
(52) U.S. Cl. .................. 340/521; 340/522; 340/539.22
(58) Field of Classification Search ................ 340/502, 340/506, 517, 518, 539.22, 539.26, 545.3, 340/600, 521, 522; 701/29, 32; 702/22; 250/287
See application file for complete search history.

(56) References Cited

U.S. PATENT DOCUMENTS

| | | | |
|---|---|---|---|
| 4,385,469 A * | 5/1983 | Scheuerpflug et al. ......... 49/41 |
| 4,544,267 A | 10/1985 | Schiller | |
| 4,586,441 A * | 5/1986 | Zekich ........................... 109/8 |
| 4,792,226 A | 12/1988 | Fishbine et al. | |
| 5,222,152 A | 6/1993 | Fishbine et al. | |
| 5,233,404 A | 8/1993 | Lougheed et al. | |
| 5,766,956 A | 6/1998 | Groger et al. | |
| 5,938,706 A | 8/1999 | Feldman | |
| 5,963,657 A | 10/1999 | Bowker et al. | |
| 6,078,265 A | 6/2000 | Bonder et al. | |
| 6,271,745 B1 | 8/2001 | Anzai et al. | |
| 6,374,652 B1 | 4/2002 | Hwang | |
| 6,588,635 B2 | 7/2003 | Vor Keller et al. | |
| 6,610,977 B2 * | 8/2003 | Megerle ...................... 250/287 |
| 6,613,571 B2 | 9/2003 | Cordery et al. | |
| 6,628,813 B2 | 9/2003 | Scott et al. | |
| 7,005,982 B1 * | 2/2006 | Frank ..................... 340/539.26 |
| 7,116,798 B1 * | 10/2006 | Chawla ....................... 382/100 |

* cited by examiner

*Primary Examiner*—Van T. Trieu
(74) *Attorney, Agent, or Firm*—Theresa M. Seal

(57) ABSTRACT

A multi sensor detection and disabling lock system includes detector cases for holding interchangeable detectors that sample for chemical, biological and radiological compounds, agents and elements, with each detector case disposed in or upon the monitored product whereupon light alarm indicators (color coded) on the detector case light up when a specific compound or agent is detected whereupon the detector case transmits detection information to a monitoring computer terminal and transmits a signal to a lock disabler engaged to the product to lock or disable the product's lock thereby preventing untrained, unauthorized and unequipped individual's from gaining access and entry to the product, and also preventing further contamination of the area. An authorized individual resets the detection system, and the system's power source is electrical, battery or computer generated. In addition, the detection system can be interconnected to surveillance towers scanning detector cases disposed at seaport docks, freight depots and rail terminals for monitoring containers being prepared for shipment or sitting on docks for long periods of time.

16 Claims, 10 Drawing Sheets

MULTI SENSOR DETECTION AND LOCK DISABLING SYSTEM

FIELD OF THE INVENTION

The present invention pertains to anti-terrorist detection and prevention systems, and more particularly pertains to a disabling lock mechanism combined with a chemical/biological/radiological detection system for use with products grouped together by similar characteristics in order to prevent unauthorized entry, contamination and terrorist activity.

BACKGROUND OF THE INVENTION

Terrorist activity is a continuous, daily, worldwide threat to the stability, prosperity, security and peace within nations and between and among nations. Its danger lies in its arbitrary destructiveness as much as in its unpredictability, and the constant threat of terrorist activity compels measures and actions that cause strain and contention in free, democratic societies as security concerns and civil liberty concerns must be balanced so that both public safety and civil liberties are maintained. Safety and security concerns can be addressed through numerous proactive steps and measures, many of which cause only minimal interference with and disruption of the daily routines of work, travel, commerce and entertainment. However, because modern industrial societies afford almost limitless places, locations, and opportunities for terrorist activities, no safety measure or security protocol will be foolproof, but many security measures, systems and protocols can be implemented that greatly minimize specific threats through fingerprint identification procedures, chemical, biological, and radiological hazard detections, bomb and explosive detection, and controlling the access to everything from shipping containers to school lockers. Thus, the prior art discloses a wide range of security measures and systems.

For example, the Fishbine et al. patent (U.S. Pat. No. 4,792,226) discloses an optical fingerprinting system that includes an optics/processor unit, a video monitor, a data terminal, and a printer for collecting and storing data characteristics of all ten individual fingerprints for printing demographic information and fingerprint images as desired on a standard booking or applicant card.

The Schiller patent (U.S. Pat. No. 4,544,267) discloses a finger identification unit that includes a fingerprint scanning apparatus using a collimated beam of light to interrogate the fingerprint of a finger placed against a platen so that successive scan positions produce signals containing fingerprint information.

The Fishbine et al. patent (U.S. Pat. No. 5,222,152) discloses a portable fingerprint scanning apparatus for optically scanning and recording fingerprint images and wirelessly transmitting such images to a mobile processing unit for verification and background checking.

The Lougheed et al. patent (U.S. Pat. No. 5,233,404) discloses an optical scanning apparatus that uses a linear charge coupled device (CCD) for recording the image of a fingerprint on the viewing surface.

The Groger et al. patent (U.S. Pat. No. 5,766,956) discloses a diode laser based sensor for undertaking optical, chemical, immunological or nucleic acid-based assay or other chemical analysis.

The Feldman patent (U.S. Pat. No. 5,938,706) discloses a multi element security system for preventing the unauthorized use of an automotive vehicle, and which includes numerous locking and control features interconnected to an onboard cpu.

The Bowker et al. patent (U.S. Pat. No. 5,963,657) discloses a safety access control for doors, handles, locks, etc., wherein the surface relief of a finger is read and verified to either allow or prevent access by the individual to the door, handle, lock, etc.

The Bonder et al. patent (U.S. Pat. No. 6,078,265) discloses a fingerprint indentification security system wherein a key lock operated security system utilizes the fingerprint of the individual to control user access to the security system, such as the ignition system of an automotive vehicle.

The Anzai et al. patent (U.S. Pat. No. 6,271,745 B1) discloses a keyless authorization system for use of a motor vehicle that includes fingerprint reading units located on the exterior or interior of the motor vehicle and which are coupled to a control unit for scanning, comparing and matching fingerprints to allow or disallow access to the motor vehicle.

The Hwang patent (U.S. Pat. No. 6,374,652 B1) discloses a fingerprint-activated doorknob in which a detecting sensor for a fingerprint is placed on the doorknob for measuring and searching the fingerprint against previously stored fingerprint inputs to control access to the door.

The Vor Keller et al. patent (U.S. Pat. No. 6,588,635 B2) discloses a safety holster for a firearm that includes a pivotally mounted retaining member and a fingerprint sensor for scanning fingerprint information so that only authorized users can withdraw the firearm from the holster.

The Cordery et al. patent (U.S. Pat. No. 6,613,571 B2) discloses a method and system for detecting biological and chemical hazards in the mail that includes sensors placed within the mail box for sampling and testing ambient air and so that mail can be safely transported through the mail system.

The Nagata patent (U.S. Pat. No. 6,628,213 B2) discloses a coding method for digital signal coding and decoding that includes a CMI (code-marked inversion) method of signal coding.

Nonetheless, despite the ingenuity of the above devices, methods, and systems, there remains a need for a multidetector and disabling lock system for use with various types of products collected together by common characteristics into product groupings for detecting chemical, biological and radiological agents and compounds and for selectively disabling and activating the product locks thereby preventing unauthorized entry and further contamination and preventing and thwarting terrorist activities.

SUMMARY OF THE INVENTION

The present invention comprehends a chemical/biological/radiological detector unit with a disabling locking system for protecting products that can be grouped into several product groupings, from terrorist activity, and also for preventing unauthorized access to and tampering with the storage and transport of ordnance and weapons. The products grouped into what may be referred to as Product grouping 1 include, but are not limited to, cargo containers, shipping containers, tractor trailers, mail carriers, mail boxes and lockers; while the products grouped into what may be referred to as Product grouping 2 include, but are not limited to, chemical, biological, radiological, and nuclear detectors, motion sensors and door sensors. The multi sensor detection system includes the capability to disable an existing lock or activate a lock located inside any of the products named in the product grouping categories upon activation of a sensor or detector included in the system. This is a significant feature for the multi sensor detection system as it prevents unauthorized, unequipped and untrained entry and access to the product thus preventing further contamination of the site and to individuals in the area.

The multi sensor detection and lock disabling system includes a detector case sized to fit in, upon or adjacent any of the aforedescribed products for detecting harmful and dangerous chemical, biological, and radiological agents, compounds and elements. In addition, the multi sensor detection and lock disabling system is capable of transmitting a signal to lock or disable a lock on the product, and is also capable of transmitting signals to a monitoring computer terminal or PC so that appropriate defensive and safeguarding actions can be undertaken and an authorized individual can disarm and reset the locking system and the multi sensor detection system. The detector case includes a power source (battery or electrical), interior compartments, Internet and GPS connections and a cpu interconnected with the Internet and GPS connections, and also interconnected with one or more off site monitoring computer terminals or PCs. The detector case-includes one or more light alarm indicators that are externally visible and that light up when the chemical, biological, or radiological agent or compound is detected, and the light alarm indicators (which can be indicator lights or panels on the front of the detector case) can be color coded for denoting the specific agent or compound detected, i.e., separate and distinct colors for indicating detection of the chemical, biological, or radiological agent or compound.

The detector case is designed to hold within the interior compartments one or more interchangeable detectors, and each detector is adapted and set up to sample a specific compound or agent. Each detector includes a sound alarm, a sensor, a light alarm, and a readings panel, and is electrically interconnected (either by wire or wirelessly) to the cpu of the detector case so that information regarding the detection of the particular agent or compound can be conveyed from the detectors to the detector case cpu. Each detector can also be used as a manual, stand-alone hand held scanner.

The multi sensor detection and lock disabling system can be interconnected to a surveillance watchtower, as well as monitoring computer terminals or PCs, with the watchtower scanning shipping and cargo crates and containers being prepared for shipment or sitting for extended periods of time on a dock or at a port, at a railway site, or at an industrial storage facility. The watchtower will scan the cargo and shipping crates and containers for the light alarm indicators on detector cases that are mounted in or upon the crates and containers, and thus continuous security surveillance of the crates and containers can be maintained.

An enhanced version of the multi sensor detection and lock disabling system can be employed to prevent car and vehicle bombings. Coupling the multi sensor detection and lock disabling system with satellite service will enable the detection system to detect explosives and transmit an alert signal by satellite to monitoring equipment at a monitoring site. Upon receiving the alert signal at the monitoring site the monitoring equipment activates a stall-to-stop process for disabling the air, fuel, electrical and/or computer system of the vehicle. Moreover, upon receiving the alert signal at the monitoring site the car or vehicle will be locked by transmission of a satellite signal that disables the vehicle's electrical and ignition system thereby preventing escape of the terrorist.

It is an objective of the present invention to provide a multi sensor detection and disabling lock system for securing news racks and vending machines in order to prevent theft, unauthorized use and terrorist activity.

It is another objective of the present invention to provide a multi sensor detection and disabling lock system for preventing terrorist activity by using products grouped together by common features in several product groupings such as design similarity, similarity in the presentation of security problems and similarity with regard to the presentation of solutions to preventing terrorist solutions.

It is still yet another objective of the present invention to provide a multi sensor detection and disabling lock system that is capable of disabling an existing lock or activating a lock inside any of the products of the product grouping lists when a detector or sensor of the system is activated.

It is still yet a further objective of the present invention to provide a multi sensor detection and disabling lock system wherein the disabling lock system prevents the unauthorized entry, access and further contamination of the products included in the several product groupings.

A still further objective of the present invention is to provide a multi sensor detection and lock disabling system that utilizes a multi-task device for preventing terrorist activity to vulnerable products that are collected or arranged by product grouping categories.

Yet a further objective of the present invention is to provide a multi sensor detection and disabling lock system to secure cargos and containers, especially cargo and shipping containers, against chemical, biological, radiological and nuclear terrorist activity.

Still another objective of the present invention is to provide a multi sensor detection and disabling lock system capable of detecting chemical, biological and radiological agents and compounds.

Still yet another objective of the present invention is to provide a multi sensor detection and disabling lock system that includes interchangeable detectors that operate in conjunction to detect chemical, biological and radiological agents and compounds.

Still yet a further objective of the present invention is to provide a multi sensor detection and disabling lock system that can be implemented by business or government at a minimum cost by organizing the products to be protected into product grouping categories.

Another objective of the present invention is to provide a multi sensor detection and disabling lock system that accurately and reliably detects harmful agents, compounds and elements, and prevents the placement and storage of weapons and bombs in the range of storage containers and facilities currently available.

Still another objective of the present invention is to provide a multi sensor detection and disabling lock system wherein the interchangeable detectors that comprise part of the system can be used as stand-alone scanners.

These and other objects, features, and advantages will become apparent to those skilled in the art upon a perusal of the following detailed description read in conjunction with the accompanying drawing figures and appended claims.

DETAILED DESCRIPTION OF THE PREFERRED EMBODIMENT

Illustrated in FIGS. 1-16 is a multi sensor detection and lock disabling system 10 for preventing terrorist activity by monitoring, detecting, and securing those critical areas, sites, and facilities vulnerable to terrorist activity. The first step is the identification of critical areas, sites, locations and facilities that are vulnerable to terrorist activity as convenient places to store and plant explosives and bombs and spread biological, chemical or radiological agents and compounds, followed by the disposition of the multi sensor detection and lock disabling system 10 for monitoring, detecting, and securing the particular location or site. Vulnerable sites, locations, facilities and areas are nearly limitless in their variety; in order to categorize the protection the present invention provides an anti-terrorist product grouping strategy has been developed wherein products made from the same or similar material, products having the same or similar design, and products presenting the same or similar security problems are grouped together with the multi sensor detection and lock disabling system 10 for preventing terrorist activity. For example, two preferred product groupings can be Product Grouping I: cargo containers, shipping containers, cargo planes, freight train cars, tractor trailers, mail carriers (UPS, FedEx), airport lockers, news racks (coin and non-coin operated), mail drop boxes, cluster mail boxes, keyed mail boxes, min-storage houses and buildings, bicycle lockers, stadium lockers, school lockers, cars, trucks, campers, buses, vans and utility vehicles. Product Grouping II: chemical detectors, biological detectors, radiological detectors, nuclear detectors, motion sensors, glass break sensors, plastic film on glass, high security locks, tampering labels, door sensors, disabling locking systems, vehicle detectors and satellite disabling locking systems. In addition to grouping products together by features, designs and materials, the multi sensor detection system 10 includes a lock disabling capability for disabling an existing lock or activating a lock on or inside any of the aforementioned products when a detector or sensor of the system is activated. The lock disabling feature is a crucial component of the invention in so far as it prevents unauthorized, unequipped or untrained individuals from gaining access and entry to the site and causing further contamination of the site.

Figure 3A:
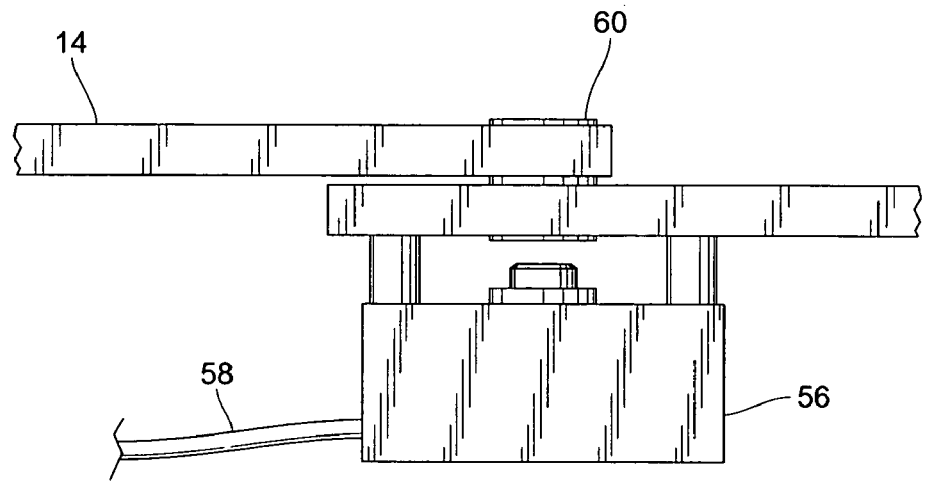
FIG. 3a is a top plan view of the multi sensor detection and lock disabling system of the present invention illustrating the mounting of one lock disabler to the lock of a product, such as a container, and disengaged from the lock of the container.
Figure 3B:
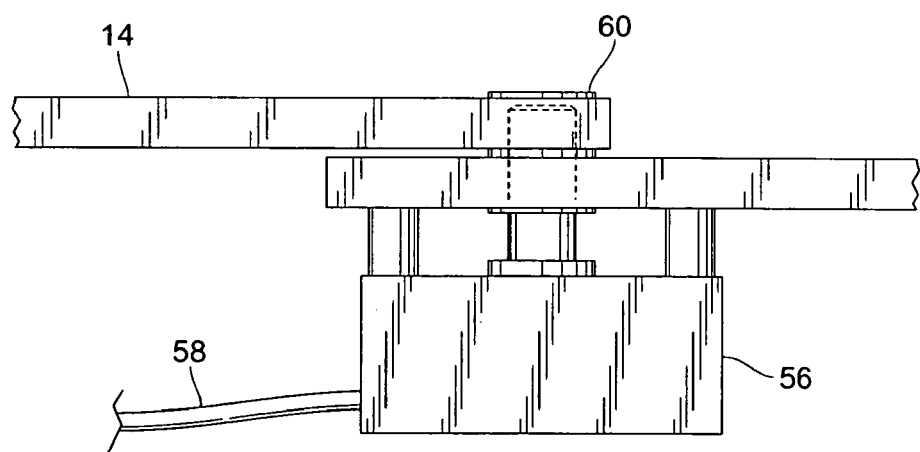
FIG. 3b is a top plan view of the multi sensor detection and lock disabling system of the present invention illustrating the engagement of the lock disabler to the lock of the product for locking or disabling the lock of the product so that unauthorized access is prevented.
Figure 4:
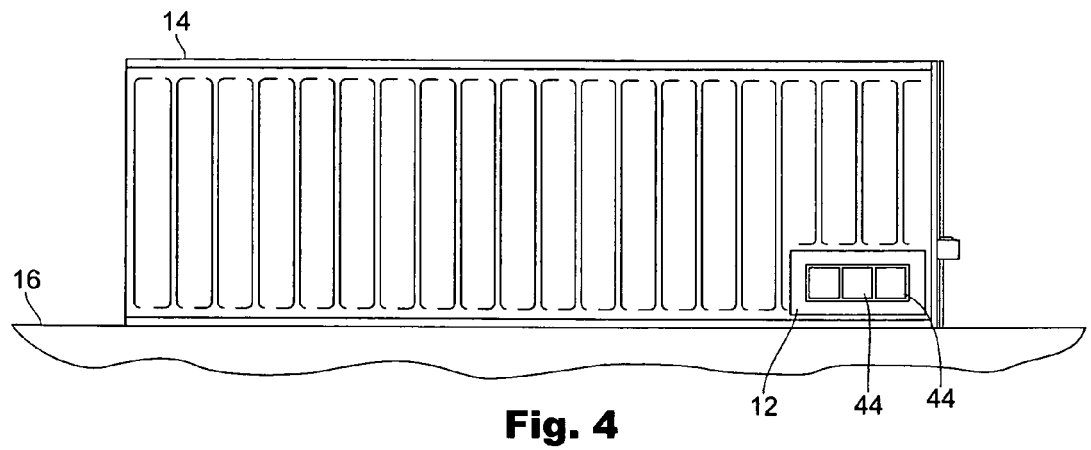
FIG. 4 is a side elevational view of the multi sensor detection and lock disabling system of the present invention illustrating the detector case mounted to the product, such as the container, with the light alarm indicators externally visible.
Figure 5:
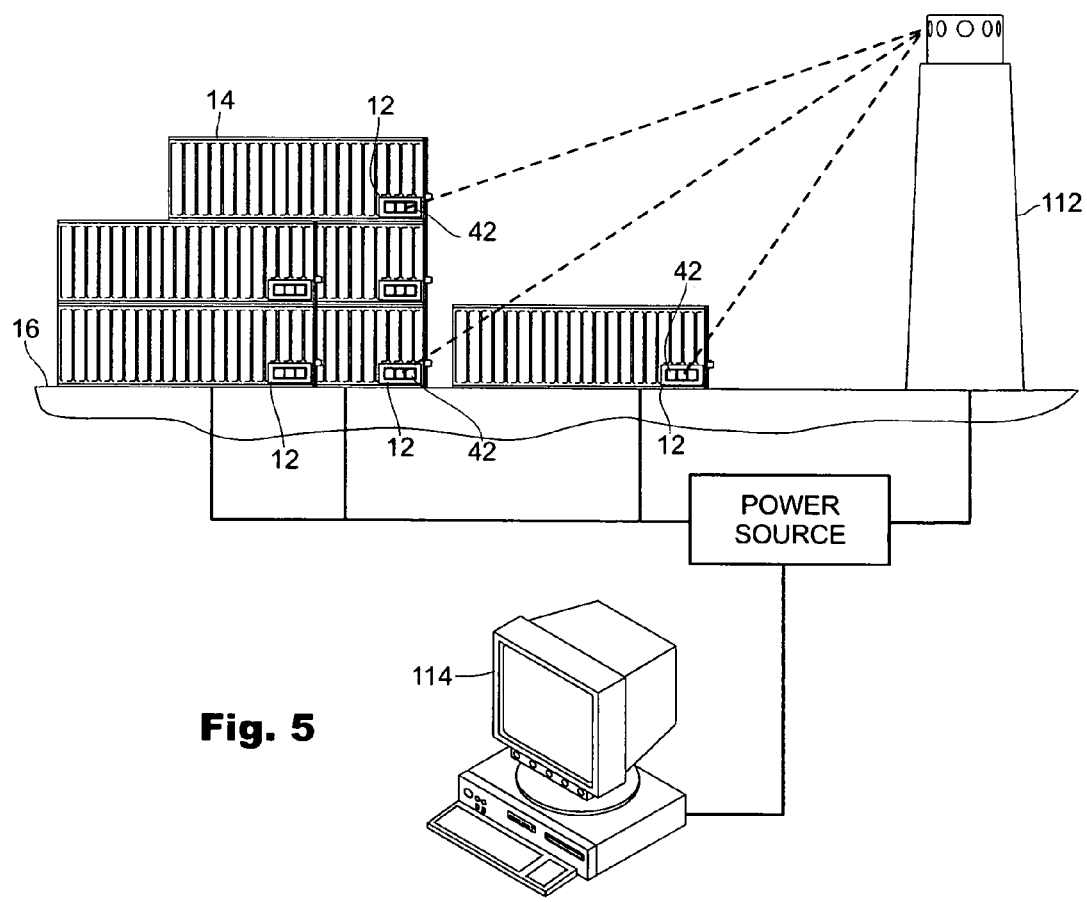
FIG. 5 is a schematic view of the multi sensor detection and lock disabling system of the present invention illustrating the interconnection of detector cases with a surveillance watchtower and a monitoring PC terminal.
Figure 6:
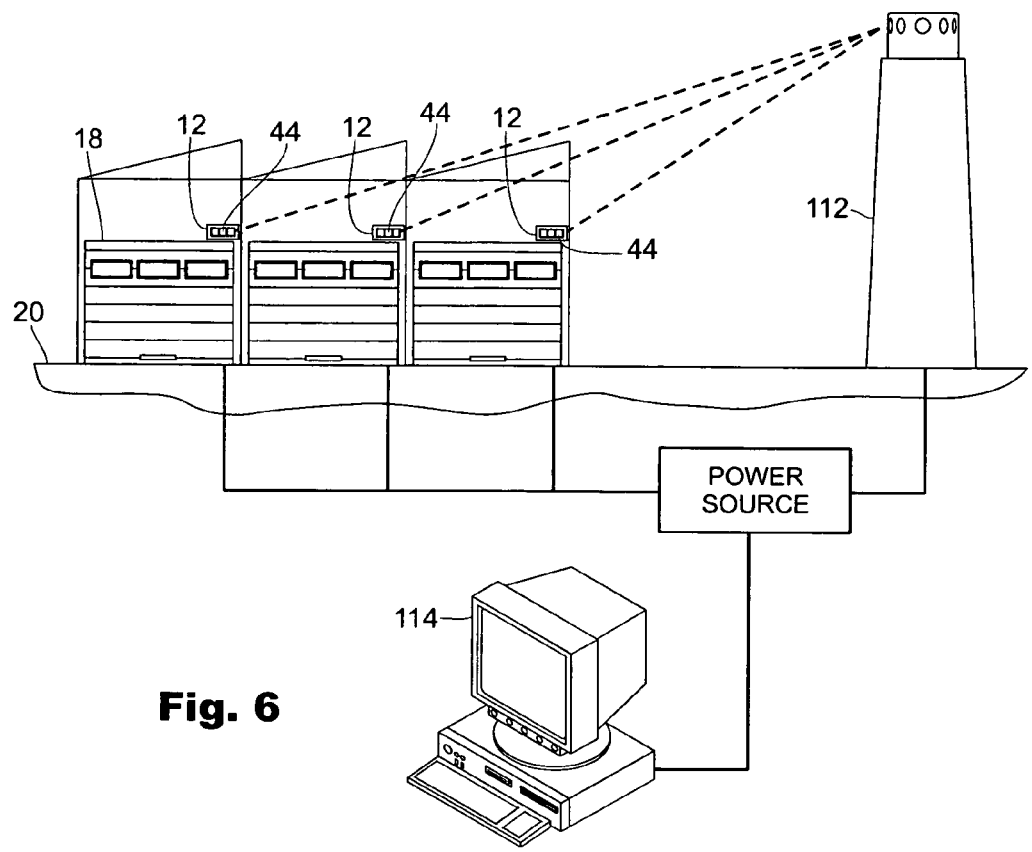
FIG. 6 is a schematic view of the multi sensor detection and lock disabling system of the present invention illustrating the placement of detector cases upon containers different from the containers of FIG. 5, and wherein the detectors case are interconnected to a surveillance watchtower and a monitoring PC terminal.
Figure 7:
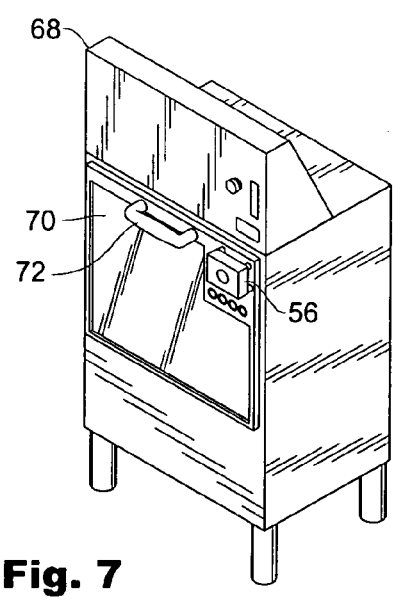
FIG. 7 is a perspective view of the multi sensor detection and lock disabling system of the present. invention illustrating the mounting of one automatic/mechanical lo lock disabler to the lock of a standalone news rack.
Figure 8:
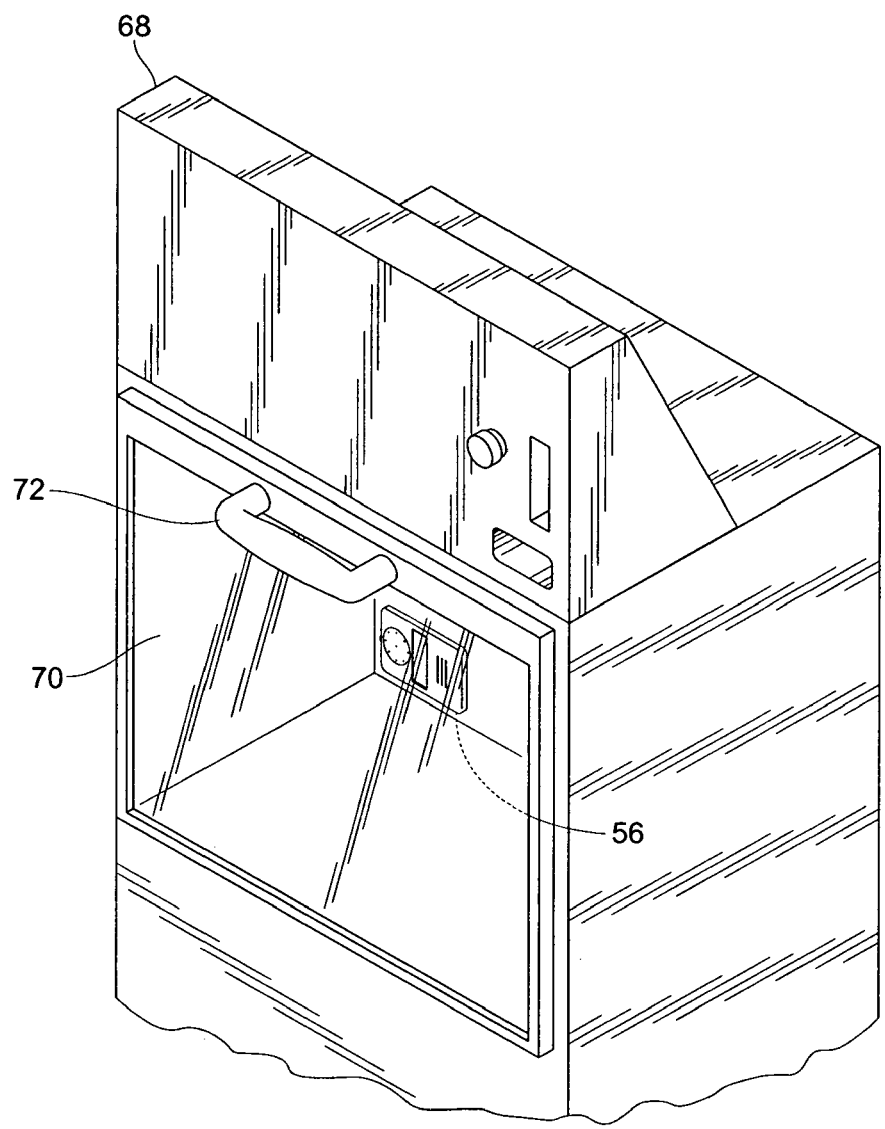
FIG. 8 is a perspective view of the multi sensor detection and lock disabling system of the present invention illustrating one interchangeable detector placed within the standalone news rack.
Figure 9:
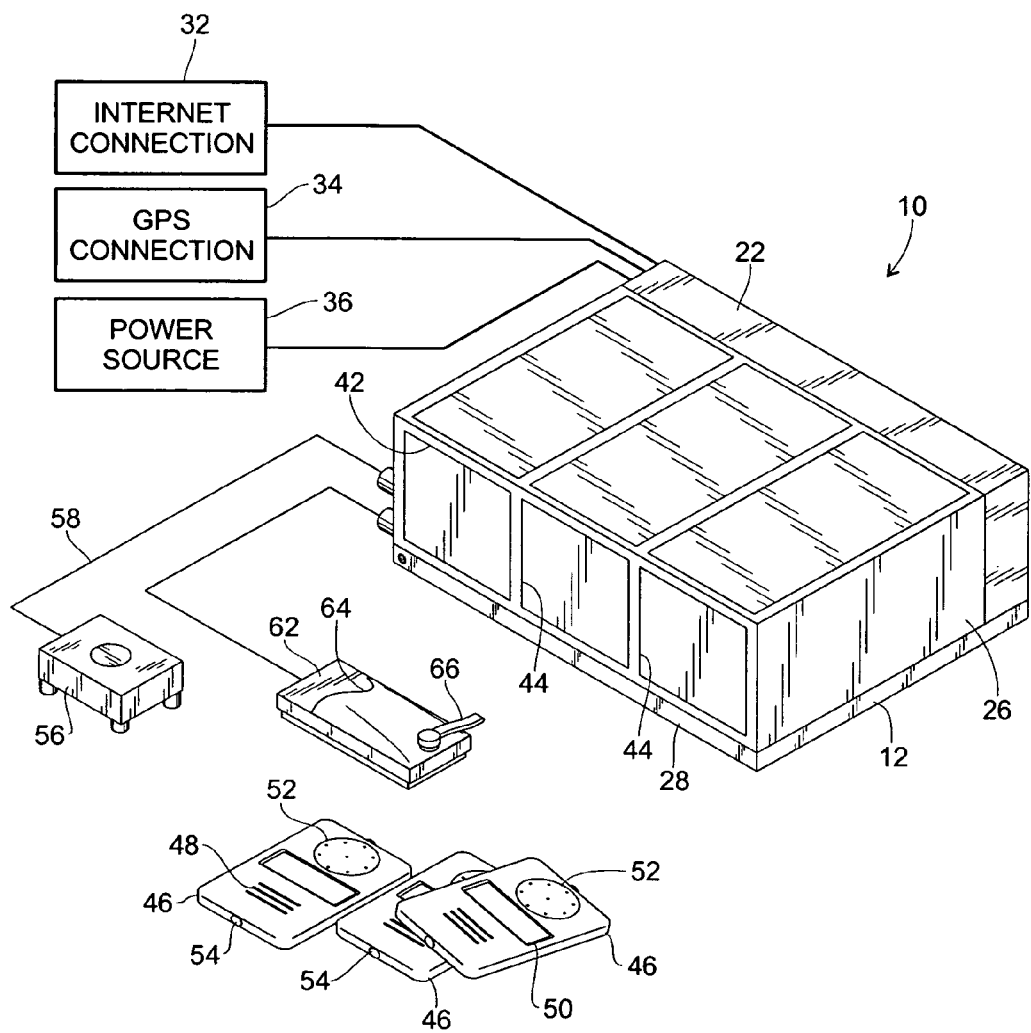
FIG. 9 is a perspective view of the multi sensor detection and lock disabling system of the present invention illustrating the detector case having color coded front panels for specifically indicating the agents, compounds or elements that have been detected.
Figure 10:
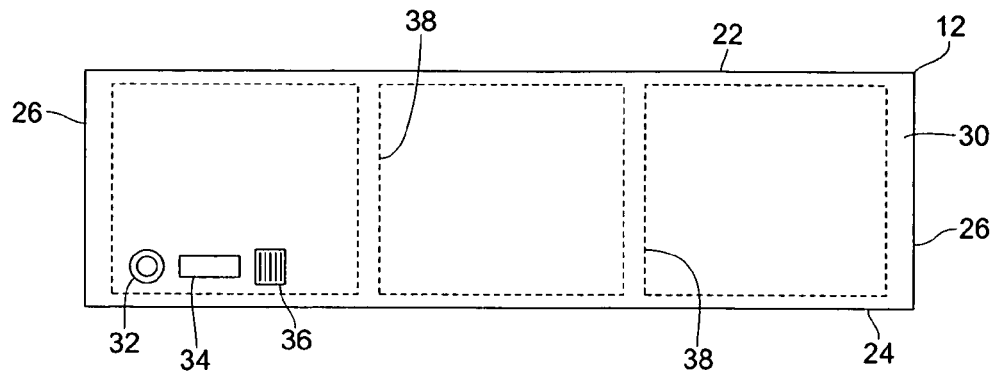
FIG. 10 is a rear elevational view of the multi sensor detection and lock disabling system of the present invention illustrating the GPS, Internet and power source connections.

As shown in FIGS. 1-10, the multi sensor detection and lock disabling system 10 includes at least one—and preferably many—detector case 12 that can be placed in, on, upon or adjacent the product, such as the shipping containers 14 of FIGS. 4 and 5 resting upon a platform 16 or the cargo container 18 of FIG. 6 sitting upon a seaport dock or pier 20. The detector case 12 includes a top 22, a bottom 24, a pair of opposed sides 26 and a front side or panel 28 and an opposite rear or back side 30. The rear side 30 has connections or contacts that can include an Internet connection 32, a GPS connection 34 and a power connection 36 for a power source. The power source for the detector system 10 can be any conventional battery or electrical source. The detector case 12 includes an interior chamber divided into a number of compartments 38 for holding therein agent or compound detection means hereinafter further described. A cpu 40 is mounted within the detector case 12 and electrically interconnects, routes, and transmits signals among items hereinafter further described and also communicates with a monitoring site and monitoring equipment. The front side 28 of the detector case 12 includes indicator means for visually indicating that a specific agent, compound or element has been detected. The indicator means can include color coded indicator lights 42 in panel form, as shown in FIG. 9, with each indicator light panel 42 lighting up with a specific color corresponding to the detection of a specific agent or compound; or color coded indicator lights 44, as shown FIG. 1, that correspond to and individually light up on the detection of a specific agent or compound (chemical, biological, or radiological).

Figure 1:
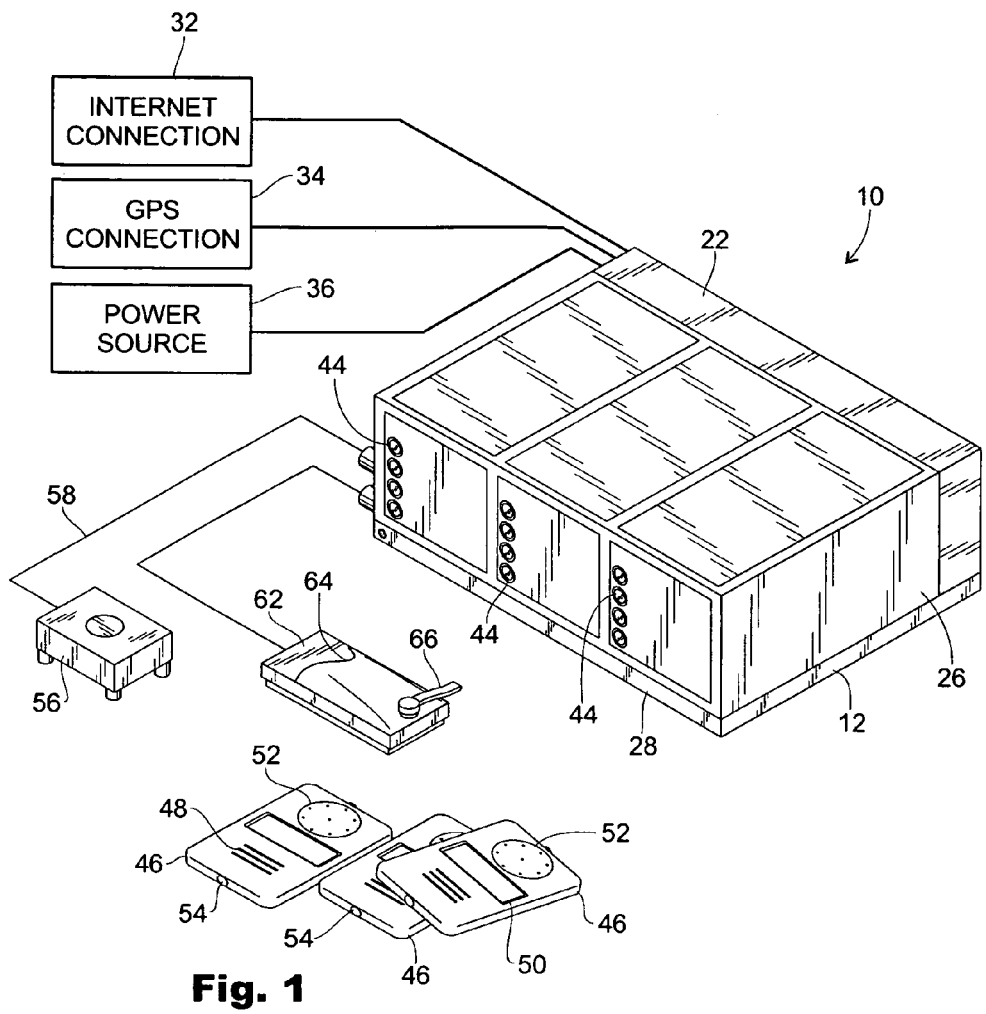
FIG. 1 is a perspective view of the multi sensor detection and lock disabling system of the present invention illustrating the primary features of the system which include a detector case, several interchangeable detectors, an automatic/mechanical lock disabler and a fingerprint biometric lock with disabler.
Figure 2:
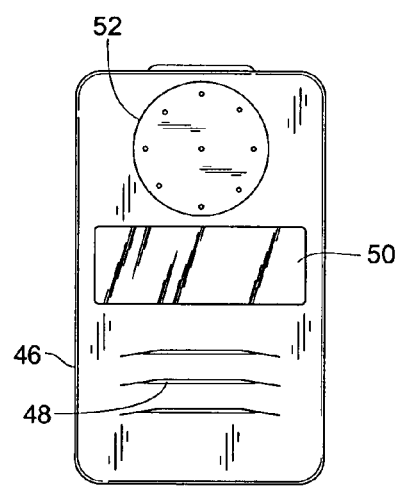
FIG. 2 is a front elevational view of the multi sensor detection and lock disabling system of the present invention illustrating one of the interchangeable detectors first shown in FIG. 1.

As shown in FIGS. 1, 2 and 9-13, the multi sensor detection and lock disabling system 10 includes a plurality of detectors 46 with each detector 46 adapted for and set up to sample for a specific agent or compound (biological, chemical, or radiological); and the detectors 46 are interchangeable for adapting to the needs and demands of future technology. The detectors 46 can also be used as stand alone scanners. In the preferred embodiment of the invention, at least three detectors 46 are placed within the detector case 12 with one detector 46 for specifically sampling biological agents or compounds, one detector 46 for sampling chemical agents or compounds, and one detector 46 for sampling radiological agents or compounds. The detectors 46 are interconnected to the cpu 40 of the detection system 10 by conventional connections that can be wire or wireless for transmitting the appropriate signals to the cpu 40 upon detection of the particular agent or compound. As shown in FIG. 2, each detector 46 includes on its front plate or facing surface a sound alarm indicator 48, a readings panel 50 comprising a plastic shield and LED lights for displaying the various read-out messages, a sensor 52 for detecting the specific agent, element or compound, and a light alarm indicator 54 that can be color coded for each specific agent and which is externally visible when the detector 46 is used as a stand alone scanner. Each detector 46 includes a conventional microprocessor for controlling the various functions and generating the appropriate signals for transmission to the cpu 40 of the detector case 12.

As shown in FIGS. 1, 3a, 3b, 9, and 13-15, used in conjunction with the multi sensor detection and lock disabling system 10 is at least one automatic/mechanical lock disabler 56—and depending upon the number of products being monitored there can be one lock disabler 56 for each product. The automatic/mechanical lock disabler 56 is physically connected to the detector case 12 by a wire or cable 58 for receiving signals therefrom for disabling an existing lock or activating a lock inside a product to prevent access to the product. By way of example, FIG. 3a shows the automatic/mechanical lock disabler 56 mounted—by any conventional means—to the lock 60 of the shipping container 14 shown in FIGS. 4 and 5 and connected by wire 58 to the cpu 40 of the detector case 12. The lock disabler 56 is in the non-activated or disengaged state in FIG. 3a. FIG. 3b shows the automatic/mechanical lock disabler 56 mounted to the lock 60 of the shipping container 14 and in the activated or engaged state after detection of an agent or compound by the system 10 thereby for locking or disabling the lock 60 of the shipping container 14 and preventing unauthorized entry and access by unauthorized, untrained and unequipped individuals. In FIGS. 3a and 3b the lock 60 secures doors of the shipping container 14 that can be slidably or pivotably opened and closed.

Figure 14:
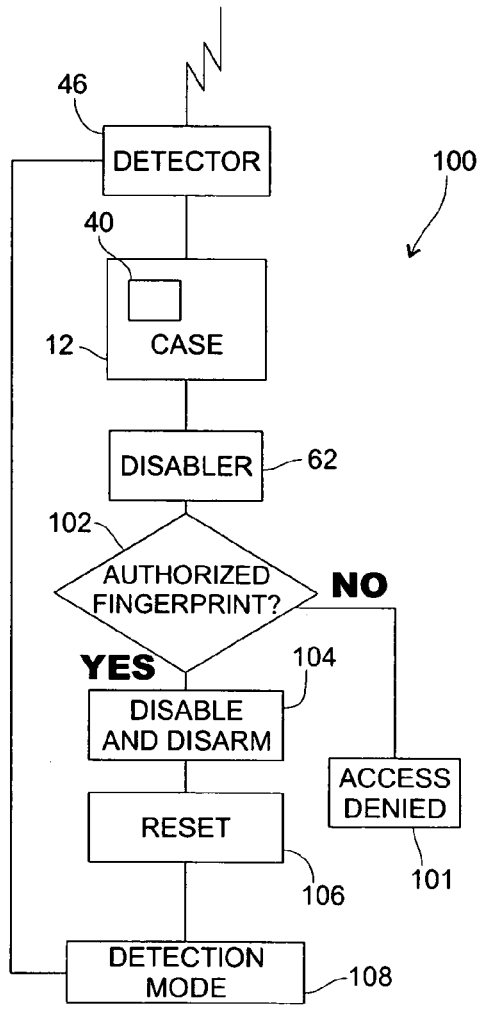
FIG. 14 is a representative schematic view of the multi sensor detection and lock disabling system of the present invention illustrating interconnection of the detector case with the fingerprint biometric lock with disabler for engaging and disengaging the fingerprint biometric lock as part of the process of detection and safeguarding the public upon detection of the agent or compound.

In addition to the automatic/mechanical lock disabler 56, the multi sensor detection and lock disabling system 10 can also utilize a fingerprint biometric lock with disabler 62 as shown in FIGS. 1 and 14. The fingerprint biometric lock with disabler 62 is interconnected to the cpu 40 of the detector case 12 for receiving transmissions therefrom after detection of an agent or compound has occurred so that the lock on the product can be locked or disabled. Moreover, resetting of the fingerprint biometric lock with disabler 62 occurs when the fingerprint of the individual is placed on the fingerprint-matching pad 64, and if a match occurs with a known fingerprint stored by the cpu 40, then the individual can reset the fingerprint biometric lock with disabler 56 by turning the manual lock disabler 66. The fingerprint biometric lock with disabler 62 is mounted to the lock of the product in a manner similar to the mounting of the automatic/mechanical lock disabler 56 that is shown in FIGS. 3 and 3b.

FIGS. 4 and 5 show one manner of disposition or placement of the detector case 12 in relation to the product, i.e., the shipping container 14, with the color coded indicator lights 42 externally viewable; FIG. 5 shows a number of shipping containers 14 each equipped with a detector case 12 and integrated with elements hereinafter further described for continuously monitoring the shipping containers 14 as they sit for an extended period of time on the truck or rail platform 16. FIG. 6 illustrates several cargo containers 18 sitting on the shipping dock or pier 20, with each cargo container 18 having a detector case 12 mounted thereon and integrated with and monitored by elements shown in FIG. 5 and hereinafter further described.

FIG. 7 illustrates a typical product from product grouping 1 that is monitored by the multi sensor detection and lock disabling system 10 of the present invention; specifically, FIG. 7 shows a news rack 68 with one automatic/mechanical lock disabler 56 mounted to and interconnected with the locking mechanism of the news rack 68. As long as there is no detection of any agent or compound, the lock disabler 56 is in the disengaged state, and the individual can deposit the coin amount in the chute and then freely open the glass panel 70 by the handle 72 for removing a paper. However, the lock disabler 56 would be activated upon detection of the harmful agent or compound and receipt of a signal from the cpu 40 for locking or disabling the locking mechanism thereby denying access to the interior of the news rack 68 from all untrained, unauthorized and unequipped individuals.

FIG. 8 illustrates one detector 46 disposed within the news rack 68 and which is visible through the panel 70 for detecting one specific agent, compound or element. The detector 46 functions as a stand-alone scanner and can be wirelessly interconnected to off site monitoring equipment.

Figure 11:
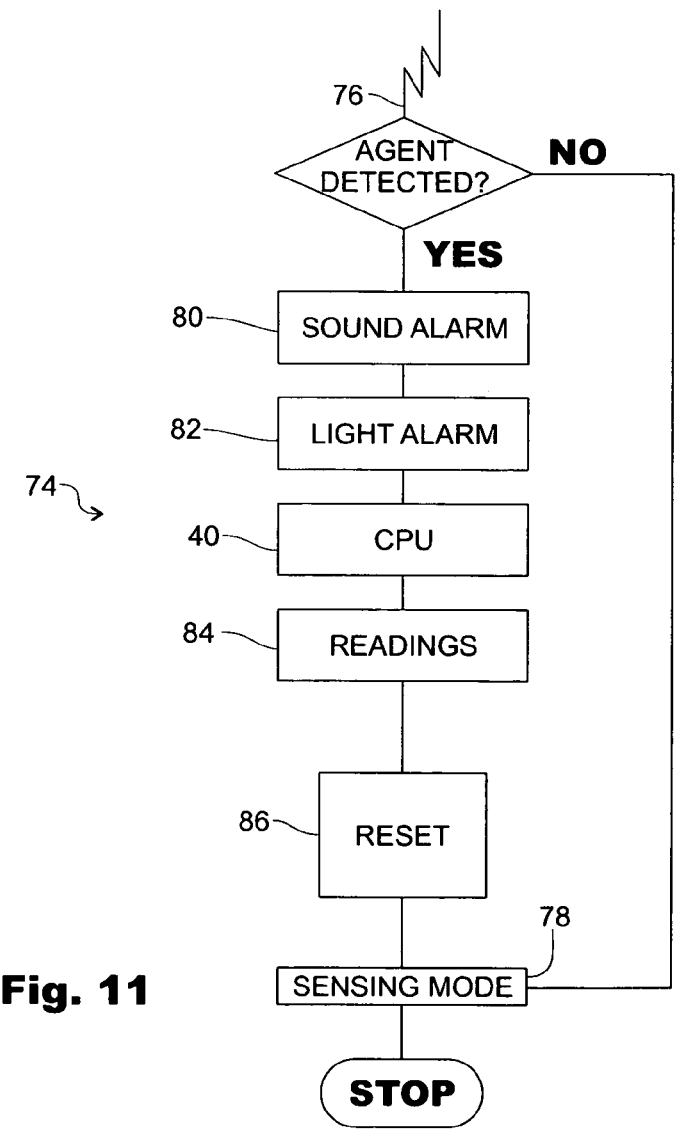
FIG. 11 is a representative schematic view of the multi sensor detection and lock disabling system of the present invention illustrating the interconnection of the detector with the detector case and the steps undertaken by the system when an agent or compound is detected.

FIG. 11 illustrates a representative schematic 74 for describing the signal transmission process from the detector 46 to the cpu 40 of the detector case 12. The external stimulus 76 would be the chemical, biological or radiological agent or compound. If there is no detection of the agent or compound, the detector 46 will stay in the sensing mode 78. However, detection of the specific agent will trigger the sound alarm 80 and the light alarm 82, and instant transmittal of a signal to the cpu 40. The readings 84 can be stored by the cpu 40 for verification and future review and evaluation. After all the appropriate corrective and preventative measures have been undertaken by the trained and authorized personal, and the site has been cleansed of the contamination, authorized and equipped personal can then reset 86 the system 10.

Figure 12:
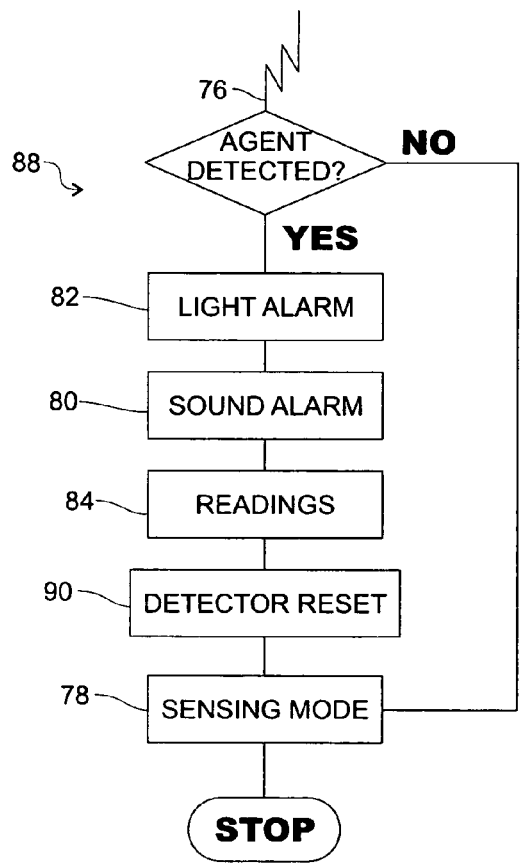
FIG. 12 is a representative schematic view of the multi sensor detection and lock disabling system of the present invention illustrating the sequence of steps undertaken by one detector when functioning as a stand alone scanner for detecting an agent or compound.

FIG. 12 illustrates a representative schematic 88 for the detector 46 when used as stand-alone scanner. The detector 46 undergoes the same essential steps as illustrated in FIG. 11, with the exception of the signal transmission to the cpu 40. The detector 46 remains in detection mode 78 until an agent is detected, and then the various functions—light alarm 82, sound alarm 80, storage of readings 84, and, after the appropriate security and safety steps have been carried out by authorized personal, detector reset 90 by authorized personal can occur thereby placing the detector 46 back in detection or sensing mode 78.

Figure 13:
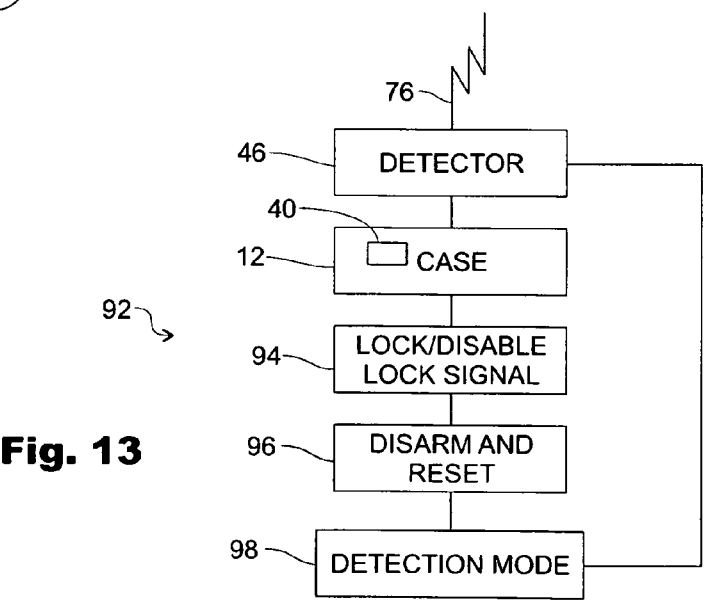
FIG. 13 is a representative schematic view of the multi sensor detection and lock disabling system of the present invention illustrating the interconnection of the detector case with the automatic/mechanical lock disabler for activating the lock disabler upon detection by the system of an agent or compound.

FIG. 13 is a representative schematic 92 that illustrates the steps undertaken by the system 10 to lock or disable a lock, such as the lock 60 for the shipping container 14 shown in FIGS. 3a and 3b. Upon detection of the agent (chemical, biological, radiological) the alarm light indicators 42 or 44 will light up providing external indication that an agent has been detected. In addition, the system 10—the cpu 40—will transmit a lock/disable lock signal 94 to the automatic/mechanical lock disabler 56 to lock or disable the lock on the product, such as the lock 60 on the shipping container 14 of FIGS. 3a-5. This prevents unauthorized, unequipped, or untrained individuals from entering or gaining access to the product for which a dangerous and perhaps lethal agent has been detected. After the proper authorities and authorized personal have been notified and all the appropriate security, preventative and clean up measures have been undertaken, the authorized individual can perform the disarm and reset function 96 for the system 10 placing the system 10 in back in the detection mode 98.

FIG. 14 is a representative schematic 100 illustrating the use of the fingerprint biometric lock with disabler 62 with the system 10. Upon detection of the agent or compound by the detector, the various alarms would sound and light up (shown in previous figures), and the cpu 40 would then transmit a signal to the fingerprint biometric lock with disabler 62 to lock or disable the lock on the product, such as the lock 60 on the shipping containers 14 shown in FIGS. 3a-5. The shipping containers 60 would remain locked and in an access denied mode 101 should an attempt be made to gain access to the container 60 by opening the lock 60 with an unauthorized fingerprint. However, a fingerprint that matches stored and authorized fingerprints 102 would indicate an authorized individual, and would allow the individual to disable and disarm 104 the lock 60 of the shipping container 14. The fingerprint biometric lock with disabler 62 would then be reset 106 after the appropriate safety, cleanup, and protection measures are completed, and the system 10 would be reset and placed back in the detection mode 108.

Figure 15:
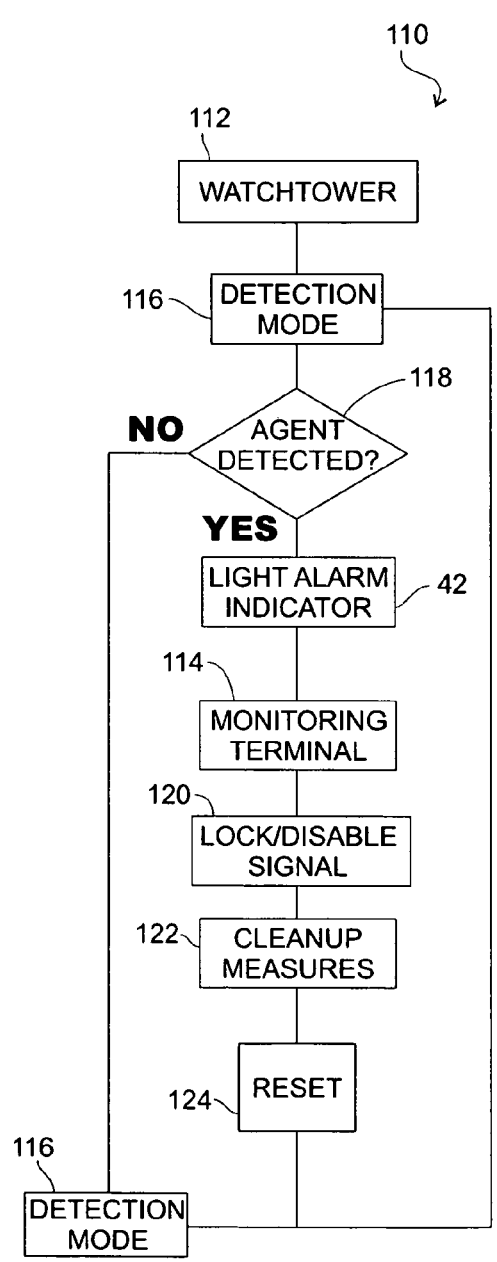
FIG. 15 is a representative schematic View of the multi sensor detection and lock disabling system of the present invention illustrating the incorporation of the system with a surveillance watchtower and a monitoring PC or computer terminal for monitoring containers, such as shipping or cargo containers, that may sit for extended time periods on docks, at rail yards, and at industrial storage facilities.

FIG. 15 is a schematic representation 110 that illustrates the integration of a surveillance watchtower 112 and a monitoring terminal or PC 114 for monitoring products such as the shipping containers 14 or cargo containers 16 that sit for extended periods of time of docks, piers 20, truck terminals, rail yards, shipping platforms 16 and industrial sites as shown in FIGS. 5 and 6. The watchtower 112 would maintain continuous surveillance over a number of shipping containers 60, for example, with detector cases 12 mounted in or on each container 14 and set in detection mode 116 with one or more detectors 46 disposed in each detector case 12. The watchtower 112 would continuously scan for light alarm indicators 42 and 44 on the products, such as the containers 14 or 18, and the watchtower 112 would be interconnected and integrated with the monitoring terminal or PC 114. Upon detection 118 of an agent or compound in one or more of the shipping containers 14, the appropriate light alarm indicators 42 or 44 would light providing visible confirmation of the detection of the specific agent or compound. The cpu 40 would transmit a lock/disable signal 120 to the lock 60 on each respective shipping container 14 to lock or disable the lock 60 thus preventing access to that respective shipping container 14. In addition, signal transmissions would be sent to the monitoring terminal or PC 114 (which could be off site) thereby alerting authorized security personal of the contamination event. With the information received at the monitoring terminal 114, authorized personal would then be notified and dispatched to the area to undertake the appropriate safety and cleanup measures 122. Such measures would also include disarming the lock disabling system in order to gain access to the shipping container 14. After all the cleanup and security measures are completed by the trained and properly equipped authorities, the detection system and the lock disabling feature would reset 124 and the detection system would again be placed in detection mode 116.

Figure 16:
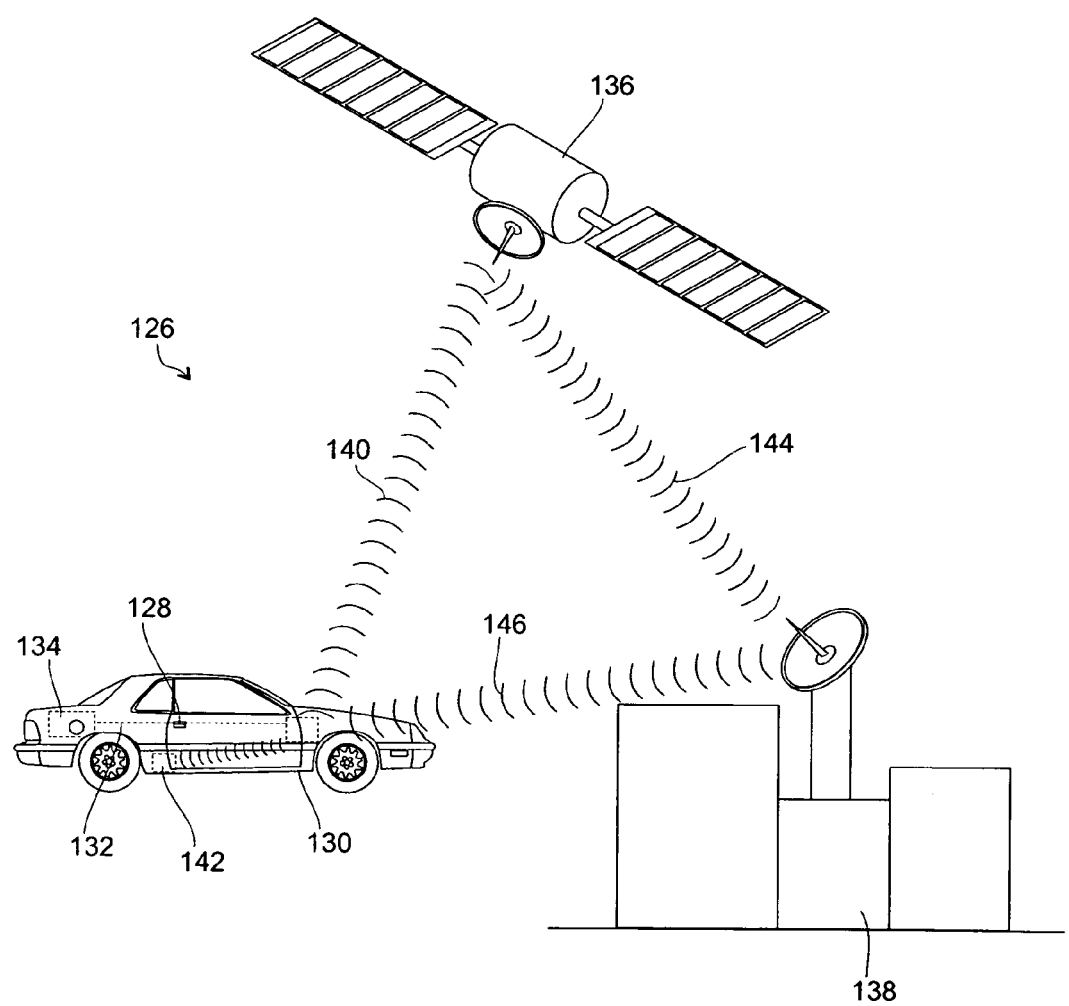
FIG. 16 is a representative schematic view of the multi sensor detection and lock disabling system of the present invention illustrating the integration of the detection system with a satellite and monitoring equipment at a monitoring site for detecting explosives placed in a vehicle and then transmitting signals to the satellite and then to the monitoring site for disabling and locking the vehicle.

FIG. 16 is a schematic representation 126 that illustrates an enhanced version of the multi sensor detection and lock disabling system 10 for preventing car and vehicle attacks and bombings. The lock disabling system 10 would be interconnected to the locking system and mechanism 128 of the vehicle 130. In addition, a stall to stop disabling link 132 can be made with the fuel, air, and electrical system 134 of the vehicle 130. The enhanced version incorporates a satellite 136 for signal receipt and transmission from the vehicle 130 in which the detector system 10 is placed to a monitoring site and monitoring equipment 138. As shown in FIG. 16, a detection signal 140 would be sent to the satellite 136 by the detection system 10 upon detection of a bomb or explosive 142 hidden in the vehicle 130. The satellite 136 would then transmit an alert signal 144 to the monitoring site 138 with the signal 144 containing the relevant data to evaluate the nature of the threat. The monitoring site 138 would then transmit a stall to stop signal 146 to the detection system 10 to lock the vehicle 130 and/or disable the electrical system of the vehicle 130 thereby disabling the vehicle 130, preventing access to the vehicle 130 by locking the vehicle 130, and preventing any terrorist in the vehicle 130 from escaping.

While the invention has been shown and described in a preferred embodiment, it will be apparent to those skilled in the art that numerous alterations, modifications, and variations will possible and practicable without departing from the spirit and scope of the invention as set forth by the appended claims.

I claim:

1. A multi sensor detection and lock disabling system for monitoring products and for detecting chemical, biological, and radiological agents and compounds so that terrorist activity can be prevented, comprising:

a detector case including a front side, a rear side, a power source and a Central Processing Unit (cpu);

a plurality of indicator lights located on the front side with each indicator light corresponding to and indicating the detection of one specific chemical, biological and radiological agent and compound;

an Internet connection, a GPS connection, and a power connection located on the rear side and which are interconnected with the cpu;

a plurality of interchangeable detectors for detecting the chemical, biological and radiological agents and compounds and capable of being disposed within the detector case;

each detector including a sound alarm indicator, a readings panel, a light alarm indicator and a sensor;

an automatic/mechanical lock disabler interconnected to the cpu and which is mounted to a lock on a product for receiving transmission from the cpu to lock or disable the lock on the product to prevent access to the product by unauthorized, untrained and unequipped individuals; and whereupon detection of specific chemical, biological, or radiological agents or compounds by the detectors causes the lighting of the corresponding indicator light for visual confirmation of the detection and initiates signal transmission from the cpu to the automatic/mechanical lock disabler to lock or disable the lock of the product thereby preventing further contamination about the product and denying access to the product by unauthorized, untrained and unequipped individuals.

2. The multi sensor detection and lock disabling system of claim 1 wherein each detector is capable of being utilized as a stand alone scanner for detecting the chemical, biological and radiological agents and compounds.

3. The multi sensor detection and lock disabling system of claim 2 further comprising a fingerprint biometric lock with disabler for mounting to the lock of the product and interconnected to the cpu for disabling and locking the lock of the product and capable of being reset by the confirmation of an authorized fingerprint.

4. The multi sensor detection and lock disabling system of claim 1 wherein the power source for the detector case can be a battery source.

5. The multi sensor detection and lock disabling system of claim 1 wherein the power source for the detector case can be an electrical source.

6. The multi sensor detection and lock disabling system of claim 1 wherein the products to be monitored can be grouped into at least two product categories based on similarities of design, similarities of materials, and similarities of security problems.

7. A multi sensor detection and lock disabling system for monitoring products and for detecting chemical, biological, and radiological agents and compounds for preventing terrorist activity, comprising:

a detector case including a front side, a rear side, a power source and a Central Processing Unit (cpu);

the front side including a plurality of indicator lights with each indicator light corresponding to one chemical, biological or radiological agent or compound and lighting up upon detection of that specific agent or compound for providing visual confirmation of the detection;

an Internet connection, a GPS connection, and a power connection located on the rear side all of which are also interconnected to the cpu;

a plurality of interchangeable detectors for detecting the chemical, biological, or radiological agents and compounds and which is capable of being disposed within the detector case;

each detector including a sound alarm indicator, a readings panel, a light alarm indicator and a sensor;

an automatic/mechanical lock disabler interconnected to the cpu and that is mounted to a lock on a product for receiving signal transmissions from the cpu to lock or disable the lock on the product thereby preventing access to the product by unauthorized, untrained, and unequipped individuals; and whereupon detection of the specific chemical, biological, and radiological agents and compounds by the detectors activates the lighting of the corresponding indicator light for providing visual confirmation of the detection and initiates signal transmission from the cpu to the automatic/mechanical lock disabler to lock or disable the lock of the product thus preventing further contamination and denying access to the product by unauthorized, untrained, and unequipped individuals.

8. The multi sensor detection and lock disabling system of claim 7 wherein each detector is capable of being used as a stand alone scanner for detecting specific biological, chemical, and radiological agents and compounds.

9. The multi sensor detection and lock disabling system of claim 8 further comprising a fingerprint biometric lock with disabler for mounting to the lock of the product and which is interconnected to the cpu for disabling and locking the product upon detection of the agent or compound and which can be reset by the confirmation of an authorized fingerprint.

10. The multi sensor detection and lock disabling system of claim 7 wherein the power source for the system is electrical.

11. The multi sensor detection and lock disabling system of claim 7 wherein the power source for the system is battery.

12. The multi sensor detection and lock disabling system of claim 7 wherein the products to be monitored can be grouped into at least two anti-terrorist product groupings based on the categories of similarities of design, similarities of material composition, and similarities of security problems.

13. A multi sensor detection and lock disabling system for monitoring products and for detecting chemical, biological, and radiological agents and compounds in order to prevent terrorist activity, comprising:

a detector case including a front side, a rear side, a power source and a Central Precessing Unit (cpu);

the front side including a plurality of indicator lights with each indicator light corresponding to one chemical, biological, or radiological agent or compound and lighting up upon detection of the respective agent or compound thereby providing visual confirmation of the detection;

an Internet connection, a GPS connection, and a power connection located on the rear side all of which are also interconnected to the cpu;

a plurality of interchangeable detectors for detecting the chemical, biological, or radiological agents and compounds and that is capable of being disposed within the detector case;

each detector including a sound alarm indicator, a readings panel, a light alarm indicator and a sensor;

an automatic/mechanical lock disabler interconnected to the cpu and which is mounted to a lock on a product for receiving a signal transmission from the cpu to lock or disable the lock on the product thereby preventing access to the product by unauthorized, untrained, and unequipped individuals;

a watchtower for monitoring the products and scanning the detector cases and which is interconnected to the cpu;

a monitoring terminal interconnected to the cpu and the watchtower with the monitoring terminal for alerting authorized individuals after detection of an agent or compound has occurred; and whereupon detection of the specific chemical, biological, or radiological agent or compound by the detectors activates the corresponding indicator light to light up for scanning and recognition by the watchtower and initiates signal transmission from the cpu to the automatic/mechanical lock disabler to lock or disable the lock of the product thus preventing further contamination and denying unauthorized, untrained, and unequipped individuals access to the product.

14. The multi sensor detection and lock disabling system of claim 13 wherein each detector is capable of being used as a stand alone scanner for detecting biological, chemical and radiological agents and compounds.

15. The multi sensor detection and lock disabling system of claim 14 further comprising a fingerprint biometric lock with disabler for mounting to the lock of the product and which is interconnected to the cpu for disabling and locking the product upon detection of the agent or compound and which can be reset by the confirmation of an authorized fingerprint.

16. A multi sensor detection and lock disabling system for monitoring vehicles in order to detect and prevent bomb and explosive attacks on the vehicles, comprising:

a detector case including a front side, a rear side, a power source and a Central Processing Unit (cpu);

means for detecting bombs or explosives within the vehicle and interconnected to the cpu for the transmission of a signal to the cpu to indicate the detection of the bomb or explosive;

an automatic/mechanical lock disabler interconnected to the electrical, air, and fuel system of the vehicle, the locking mechanism of the vehicle, and to the cpu;

monitoring equipment capable of receiving and transmitting signals to and from the cpu;

a satellite interconnected with the cpu and the monitoring equipment for the receipt and transmission of signals therebetween; and whereupon detection of the bomb or explosive within the vehicle causes signal transmission to the monitoring equipment for activating a stall to stop signal from the monitoring equipment to the vehicle that disables the electrical, fuel and air systems of the vehicles and a locking signal that locks the doors of the vehicle.

* * * * *